United States Patent

Schrader et al.

[11] Patent Number: 5,168,743
[45] Date of Patent: Dec. 8, 1992

[54] LIFE CYCLE INDICATOR TORSION SPRING

[75] Inventors: Gary E. Schrader; Armand Montminy, both of Manchester, N.H.

[73] Assignee: Burndy Corporation, Norwalk, Conn.

[21] Appl. No.: 774,334

[22] Filed: Oct. 10, 1991

[51] Int. Cl.⁵ .......................................... H01R 43/042
[52] U.S. Cl. ........................................ 72/410; 29/751; 29/173; 267/155; 267/275
[58] Field of Search ..................... 72/410, 409; 29/751, 29/758, 173; 81/313, 338, 367, 375, 422; 267/155, 275

[56] References Cited

U.S. PATENT DOCUMENTS

| D. 188,259 | 6/1960 | Gibson . | |
|---|---|---|---|
| 1,947,927 | 2/1934 | Vorwerk | 29/173 |
| 2,679,228 | 5/1954 | Gryce . | |
| 2,729,995 | 1/1956 | Friedman | 72/409 |
| 2,774,269 | 12/1956 | Demler et al. . | |
| 3,137,268 | 6/1964 | Hornwood . | |
| 3,322,008 | 5/1967 | Filia | 81/313 |
| 3,406,558 | 10/1968 | Tillmann | 72/416 |
| 4,118,971 | 10/1978 | Izraeli . | |
| 4,126,936 | 11/1978 | Koller | 72/410 |
| 4,409,841 | 10/1983 | Archer . | |
| 4,698,623 | 10/1987 | Smith . | |
| 4,703,711 | 11/1987 | Haynes . | |
| 4,829,805 | 5/1989 | Koehn | 81/313 |
| 4,926,685 | 5/1990 | Shannon, Sr. . | |

Primary Examiner—Daniel C. Crane
Attorney, Agent, or Firm—Hoffman, Wasson & Gitler

[57] ABSTRACT

A crimping tool comprises a pair of handles, crimping jaws, dies, and/or die nests, positioned at one end of the handles and in alignment with each other to receive a connector therebetween, a linkage extending between the handles and joining same together such that one handle pivots relative to the other and forces the jaws, dies, and/or die nests toward each other. A spring is positioned between the handles to facilitate the opening movement of the tool. The spring in the present invention is configured with a fracture zone, and is positioned in such a location that the spring is flexed during each cycle of operation. The fracture zone may include one or more coils, and such coils break, after a predetermined number of cycles, to affirmatively indicate to the user that the tool requires inspection and/or servicing. When the spring breaks, the tool may still be manually opened, but only with some difficulty, so that the operator cannot ignore the need for inspection and/or servicing.

7 Claims, 3 Drawing Sheets

LIFE CYCLE INDICATOR TORSION SPRING

BACKGROUND OF THE INVENTION

The present invention relates generally to indicators for indicating that a tool has reached its life cycle capacity. More specifically, the present invention relates to a simple mechanical indicator, that functions in a positive manner, to inform the user of the tool, that an inspection thereof should be made before the tool is used again.

SUMMARY OF THE INVENTION

Crimping tools for securing metal connectors to electrical conductors are well known and widely used. A representative crimping tool is shown in U.S. Design Pat. No. 188,259, granted Jun. 21, 1960, to Howard B. Gibson, and assigned, on its face to The Thomas & Betts Co. Other crimping tools are shown in U.S. Pat. No. 4,118,971, granted Oct. 10, 1978 to Hyman Izraeli and in U.S. Pat. No. 4,926,685, granted May 22, 1990, to John K. Shannon, Sr.

Known crimping tools generally include a first handle, a second handle and a mechanical linkage located intermediate the first and second handles to allow pivotal movement therebetween, a first die or die nest secured to the remote end of the first handle, and a second die secured to the remote end of the second handle in alignment with the first die. A torsion spring biases the handles apart so that a connector can be inserted therein into an aperture defined between the dies.

After a conductor is introduced into the connector, and is properly aligned therewithin, the ends of the handles remote from the dies are operated, manually, in a plier-like manner. The crimping pressure exerted by the dies upon the connector radially indents same, and mechanically, and electrically, joins the connector to the conductor. After each crimping operation, the torsion spring disposed between the handles urges the handles to swing apart, to an open position, so that the connector and conductor can be removed from the dies.

The dies and/or die nests, and/or uniquely shaped jaws with die surfaces formed, machined, or inserted therein, receive the greatest amount of wear in crimping tools. Although such working surfaces may be hardened by numerous techniques which increase the life of the tool, and although the tool may be manufactured and assembled within close tolerances, the tool gradually loses its ability to produce crimped connections within acceptable dimensional specifications. At such point, the tool must be serviced, and the working surfaces must be replaced or repaired, so that the tool may, once again, produce crimped connections within acceptable specification limits.

Since the decay of the capability of a crimping tool is a gradual process that occurs over an extended period of time, such decay frequently occurs undetected by the user of the tool. This problem is compounded because the crimped connections formed by the tool do not indicate, to the naked eye, that the connection is no longer within specification limits.

The present invention achieves a simple, yet effective, solution to the problem of tool decay noted above. The solution focuses upon the biasing spring used previously only to urge the handles of the tool apart. Such spring, which is uniquely shaped, now serves a dual function—(a) to bias the handles of the tool apart, and (b) to furnish on a positive, unmistakable indication that the tool effectiveness has decayed and requires inspection and/or servicing. To achieve these goals, the torsion spring fractures after a predetermined number of cycles and the jaws of the tool will not open automatically, but can be opened only with some degree of difficulty. The operator will immediately detect such significant change in the operating characteristics of the tool.

In tests conducted during the development of the present invention, a torsion spring, with a single turn serving as the fracture zone operated successfully for up to 44,000 cycles before breaking. In subsequent tests conducted at a later stage in the development process, a torsion spring, with a double coil serving as the fracture zone, operated successfully up to 90,000 cycles before breaking; the tool functioned satisfactorily up to 100,000 cycles before failing.

The present invention will be easily incorporated into a new series of crimping tools, and can be retrofitted onto existing tools, thus expanding the commercial potential for such invention. The coil spring will add little cost to the tool, so that the increase in the reliability of connections will return a significant commercial benefit to its user.

Other advantages and benefits that flow from the present invention will become readily apparent to the artisan, when the appended drawings are construed in harmony with the detailed specification.

DESCRIPTION OF THE PREFERRED EMBODIMENT

Figure 1:
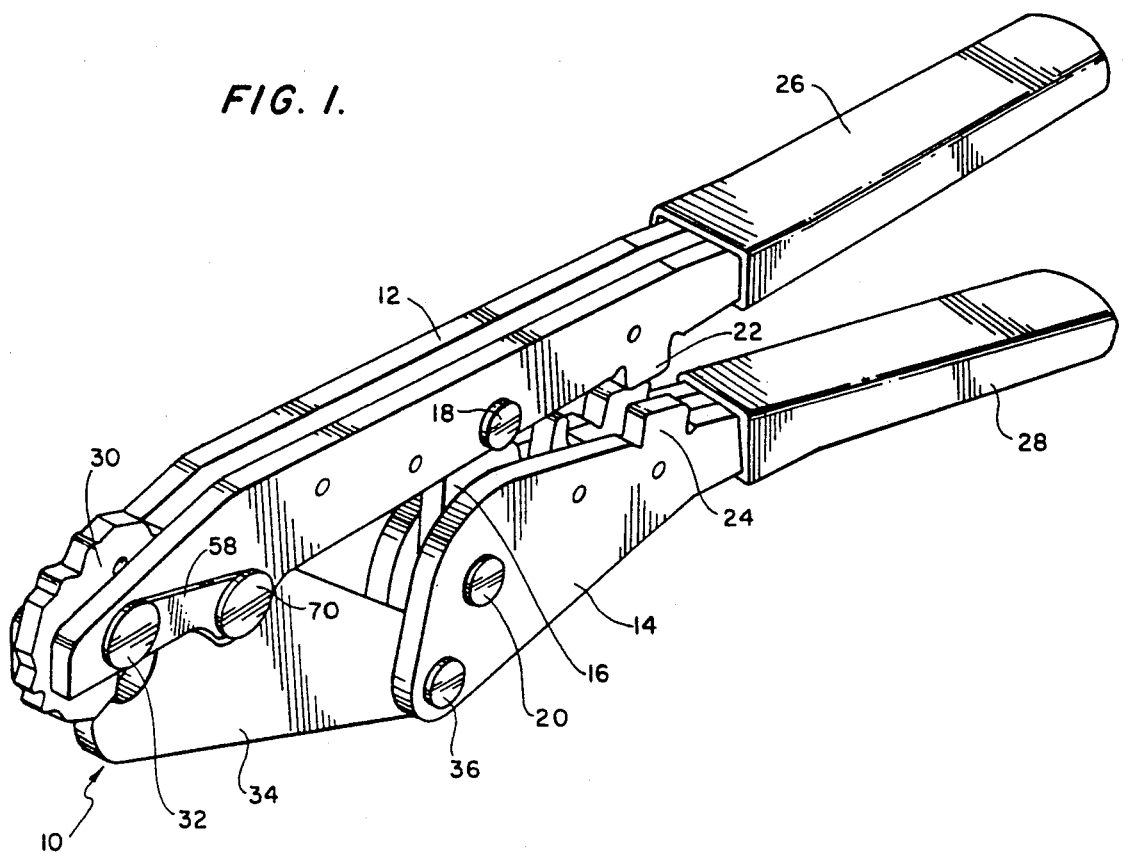
FIG. 1 is a perspective view of a crimping tool including a torsion spring configured in accordance with the principles of the present invention.

FIG. 1 depicts a crimping tool 10 employing a life cycle indicator torsion spring constructed in accordance with the principles of the present invention. Tool 10 comprises a first handle 12, a second handle 14, and a link 16 that joins the handles together. An upper pin 18 passes through the first handle and an aperture in link 16, so that the link is secured to the first handle. A lower pin 20 passes through the second handle and a different aperture in link 16, so that the link is secured to the second handle. Link 16 pivots about pins 18, 20 as the handles are brought toward one away, or separated therefrom, and opposing stops 22, 24 limit the movement of the handles toward one another.

A first plastic sleeve 26 is slipped over the rear end of handle 12, and a second plastic sleeve 28 is slipped over the rear end of handle 14. An indexable die wheel 30 is situated at the forward end of handle 12, and a pin 32 extends transversely across the handle and through a central aperture in the die wheel. A crimping jaw 34 is located at the forward end of handle 14, and a pin 36 extends transversely across the handle and through an aperture in the jaw 34. The jaw pivots about pin 36 and cooperates with die wheel 30.

Figure 2:
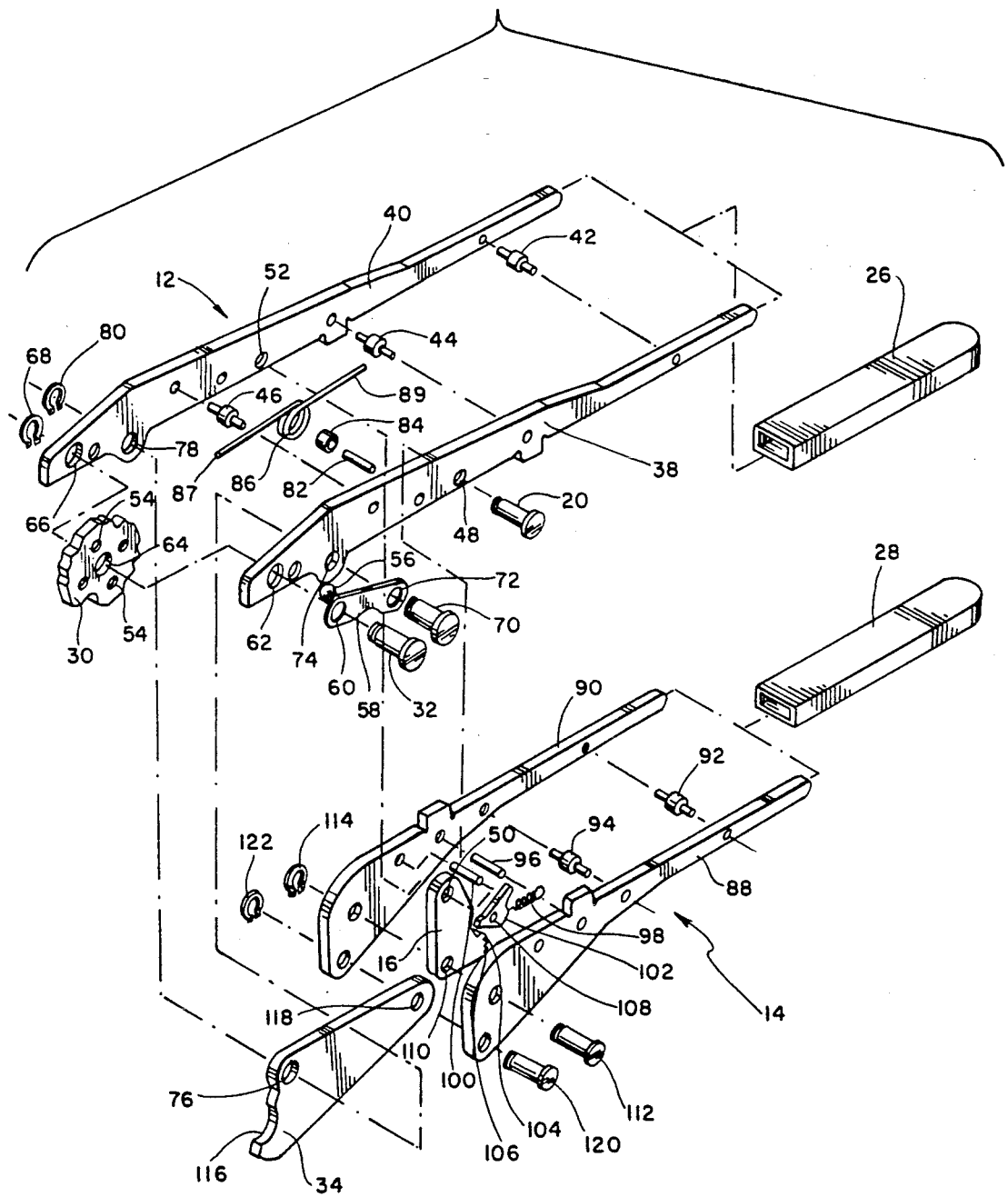
FIG. 2 is an exploded perspective view of the crimping tool of FIG. 1.

The exploded perspective view of FIG. 2 shows additional details of the construction of crimping tool 10. For example, first handle 12 is formed from a pair of identically configured plates 38, 40 that are retained in parallel relationship by spacers 42, 44 and 46. Each spacer has an enlarged central section with a cylindrical peg extending from opposite sides thereof; each peg fits into an aperture in plates 38, 40. Pin 20 passes through aperture 48 in plate 38, through aperture 50 in link 16, and thence exits the tool through an aligned aperture 52 in plate 40. An enlarged head may be formed at one end of pin 20, and a metal clip may fit into a groove (not shown) at the opposite end thereof, to maintain the pin in a fixed position relative to link 16.

Die wheel 30 has dies, or die nests, of different configurations and/or depths spaced radially about its periphery. The dies enable the tool 10 to receive, and retain, a variety of connectors in fixed relationship to the working surface of crimping jaw 34. A plurality of dimples 54 are formed on the side of wheel 30, and a ball 56 is urged by flexible metal strap 58 into one of the dimples. The ball and dimple each function as a detent to retain the die wheel in fixed position. A pin 32 extends transversely through an aperture 60 formed in strap 58, through an aperture 62 formed at the forward end of plate 38, through aperture 64 in die wheel 30, and through the aligned aperture 66 at the forward end of plate 40. One end of pin 32 has an enlarged head, while the opposite end of pin 32 is retained in position by metal clip 68. Die wheel 30 is indexed about pin 32 intermediate plates 38 and 40.

A pin 70 passes through a second aperture 72 in strap 58, through an opening in ear 74 in plate 38, and thence through an aperture 76 near one forward end of jaw 34. Pin 70 extends through an opening in ear 78 in plate 40. One end of pin 70 has an enlarged head, while the opposite end of the pin is held in fixed position by metal clip 80.

A stub shaft 82 is situated between spacers 44, 46, and the opposite ends of the shaft fit into aligned apertures in parallel plates 38, 40, respectively. A cylindrical sleeve 84 is slipped over shaft 82, and the coiled, central section of torsion spring 86 fits over sleeve 84. The legs 87, 89 of spring 86 extend freely, in opposite axial directions, away from the central section of the spring. To illustrate, the forwardly extending leg 87 contacts one side of link 16, while the rearwardly extending leg 89 passes beneath spacer 44.

Second handle 14 is also formed from a pair of identically configured plates 88, 90 that are retained in parallel relationship by spacers 92, 94. Opposite ends of the spacers are received in aligned apertures in the plates, which are maintained in a parallel, spaced apart, relationship. Stub shaft 96 extends between aligned apertures in plates 88 and 90, and one end of a coil spring 98 is anchored to shaft 96. A second stub shaft 100 extends between aligned apertures in plates 88 and 90, and a pawl 102 with an opening 104 therethrough is mounted on stub shaft 100 for pivotal movement relative thereto. The opposite end of spring 98 is secured to pawl 102 to bias same toward link 16.

Link 16 is substantially triangularly-shaped, when viewed in side elevation. A series of teeth 106, and a recess 108, are defined on the downwardly sloping face of the link. Pawl 102 cooperates with teeth 106 and recess 108, to ensure that the crimping operation of the tool has been completed before the jaws can be opened.

In addition to aperture 50 near the apex of triangular link 16, a second aperture 110 is formed therethrough at the lower, forward edge of the link. A pin 112 extends through aligned apertures in plates 88, 90 and passes through aperture 110 in link 16. Pin 112 may have an enlarged head, and a metal clip 114 fits into a groove (not shown) at the far end of the pin to securely lock same into position.

Crimping jaw 34 is secured by pin 70, which passes through aligned apertures in the ears 74, 78 of plates 38, 40 of handle 12, for pivotal movement about pin 70 and relative to handle 12. Jaw 34 is mounted in alignment with die wheel 30 for cooperation therewith; the working surface 116 on jaw 34, which may be work hardened, tempered, or otherwise treated to increase its life, delivers a radially directed crimping force to a connector (not shown) retained in the aligned die nest, or recess, in die wheel 30.

An opening 118 is formed near the rear end of crimping jaw 34, and a pin 120 passes through the aligned openings near the forward ends of plates 88, 90, and through opening 118, as well. Pin 120 may have an enlarged head at one end, and a metal clip 122 is seated upon the opposite end of the pin. The enlarged head and clip seat the pin and retain same in fixed position so that jaw 34 can pivot relative to pin 120. Sleeve 28 is slipped over the rear ends of plates 88, 90, so that the tool can be comfortably gripped, and manipulated, by the user.

Figure 3:
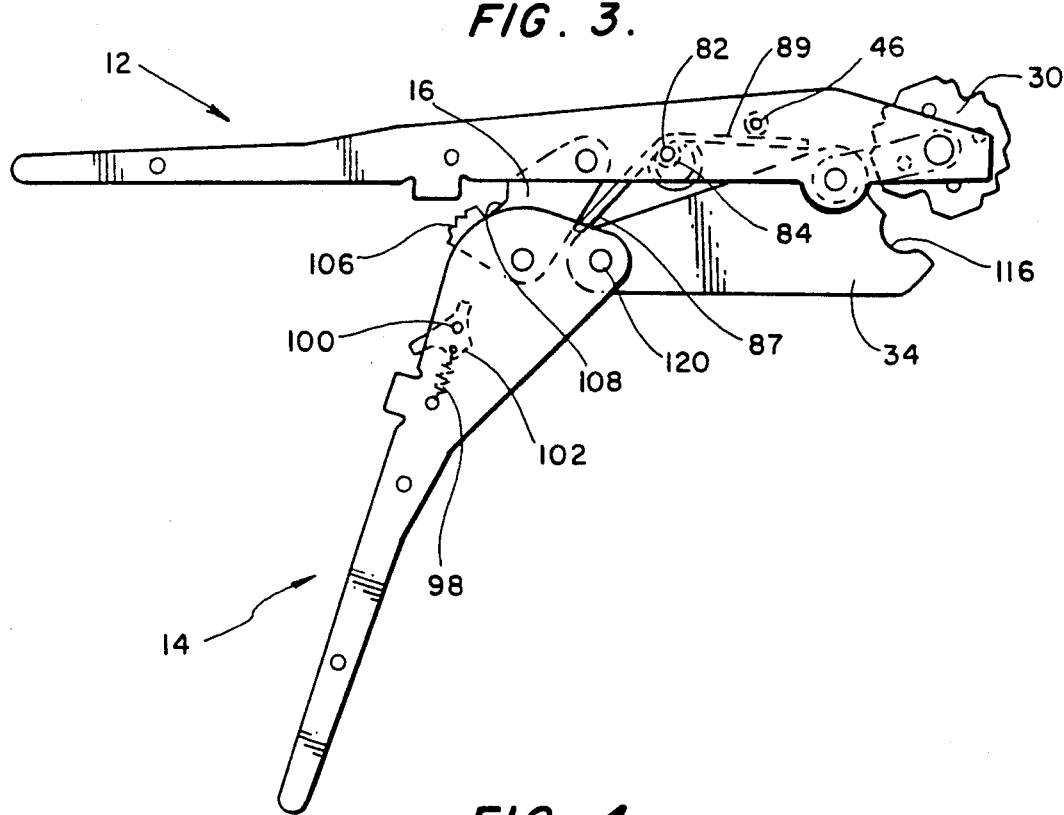
FIG. 3 is a side elevational view of the crimping tool of FIG. 1, with the tool in the opened position.
Figure 4:
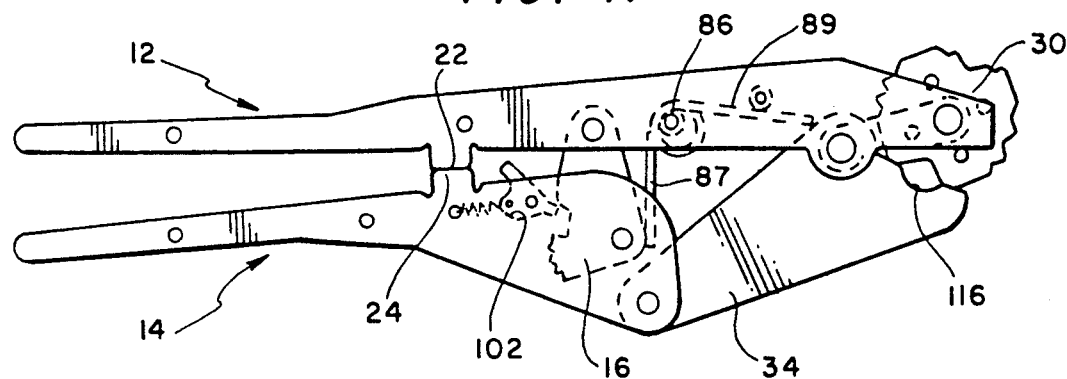
FIG. 4 is a side elevational view of the crimping tool of FIG. 1, with the tool in the closed position.

FIGS. 3 and 4 illustrate the manner in which the crimping tool is operated, and the functioning of torsion spring 86 is also emphasized. Handle 14 is pivoted, or swung, counterclockwise, thus pivoting jaw 34 away from die wheel 30. Die wheel 30 may be indexed so that a die nest, or cavity, of the desired size is placed opposite working surface 116 on jaw 34. A connector (not shown) is placed in the selected cavity in the die wheel, and a conductor (not shown) is inserted into the connector. The forwardly extending leg 87 of torsion spring 86 is retained by spacer 46, while the rearwardly extending leg 89 of spring 86 presses against link 16.

When manual pressure is applied by the operator, or user, of the tool, as by a squeezing motion, handle 14 pivots clockwise about pin 112 toward handle 12. During the course of its clockwise movement, pawl 102 engages teeth 106 on link 16. The pawl advances upwardly along teeth 106, so that the closing action of the jaws continues until jaw 34 has fully imparted its radially directed crimping force to the connector and conductor retained in the selected die nest. As pawl 102 advances beyond the uppermost tooth, the pawl enters recess 108, and, under the urging of biasing spring 98, pivots out of operative engagement. The handles 12, 14 are closed, so that stops 22, 24 are in abutting relationship.

Leg 89 on spring 86 has been flexed inwardly, or counterclockwise, over an arc of several degrees, during the closing movement of the handles of the tool. When the operator, or user, discontinues the squeezing pressure previously imparted to the tool, spring 86 relaxes and returns to its normal, unstressed condition. Leg 89 presses against link 16, which pivots clockwise about pin 18, so that handle 14 is biased toward the open position of the tool shown in FIG. 3. The tool can be opened, and operated, without reliance upon spring 86; however, the restoring force imparted by spring 86 makes tool operation easier, and less fatiguing to the user. Leg 89 of spring 86 is flexed each time the handle 14 is pivoted to its closed, or crimping, position, and spring 86, if properly designed, fabricated, and assembled, may serve as a simple, mechanical indicator for the number of cycles of operation of the crimping tool.

Figure 5:
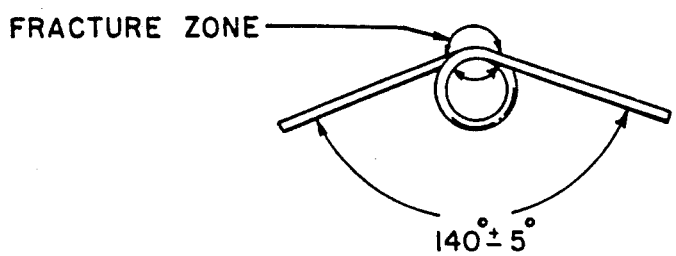
FIG. 5 is a front elevational view, on an enlarged scale, of a preferred embodiment of the torsion spring, such spring including a single coil in the fracture zone.

FIG. 5 shows one configuration of a torsion spring 86, with legs 87 and 89, extending in opposite directions. The central portion of spring 86 consists of one turn of spring steel. The spring is designed to fracture cleanly in the area intermediate the legs 87, 89; such area, which may be augmented by scoring or metal embrittlement techniques, as necessary, fractures cleanly when a predetermined number of cycles of tool operation have been effectuated. In one prototype crimping tool, for example, with the legs 87 separated by approximately 140° in the normal, unstressed condition, spring 86 fractured after 45,000 to 55,000 cycles of operation; the crimp tool utilizing spring 86 was designed to achieve crimping operations, within the dimensional tolerances established for the crimped connections, over a life span of 60-70,000 cycles. Thus, torsion spring 86 fractured at a time in the operational life of the crimping tool when the tool was still functioning satisfactorily. The fracture of spring 86 is readily detected by the user of the tool, for while the tool can still be opened and closed manually, far greater effort is needed to open the tool, without the assistance, or urging, of spring 86. The user is thus forewarned that the crimping tool needs inspection, maintenance, and perhaps, replacement, if acceptable crimped connections are to be made, in futuro.

Figure 6:
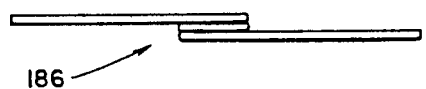
FIG. 6 is a top plan view, also on an enlarged scale, of an alternative embodiment of the torsion spring, such spring including multiple coils in the fracture zone.
Figure 7:
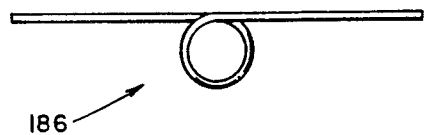
FIG. 7 is a front elevational view of the torsion spring of FIG. 6

FIGS. 6 and 7 show an alternative configuration of the unique torsion spring. The alternative spring is identified, generally, by reference numeral 186. The central body of the spring 186 employs two, or more, coils of steel or similar flexible, resilient, metallic material. Spring 186 is configured to fail, or fracture, in the desired fracture zone after 90,000 cycles of tool operation. The tool can produce crimped connections, within acceptable tolerances, for 100,000 cycles. Thus, spring 186 also provides a positive warning to the user of the tool that inspection, maintenance, and perhaps, replacement, of at least the working surfaces, is imminent and cannot be overlooked. The increased difficulty of using the crimping tool reinforces, and accentuates, in a tactile fashion, such warning message. The message cannot be turned off, or defeated, by the user of the tool. It is noted that the legs 187, 189 of spring 186 are disposed approximately 180° apart, in contrast to the 140° arc between legs 87, 89 of spring 86.

The foregoing description of the preferred embodiment of the present invention shown in FIGS. 1-5, and the brief description of the alternative embodiment in FIGS. 6-7, should be considered as being illustrative in nature. The size, location, and exact configuration of torsion springs 86 and 186 are only suggestive of other spring configurations that may be suitable for use as life cycle indicators. Also, while the present invention describes a crimping tool, the life cycle indicators could be applied to other manually operated tools, as well; conceivably, the same principles could even be introduced into automatically operated tools and machines. Consequently, the appended claims should not be limited to their literal terms, but should be broadly construed in a manner consistent with the significant advance, in the useful arts and sciences, to which this invention appertains.

What is claimed is:

1. A crimping tool comprising:
   a) a first handle having a forward end and a rearward end,
   b) a die wheel with recesses defined about its periphery secured to the forward end of said first handle,
   c) a second handle having a forward end and a rearward end,
   d) a jaw with a crimping surface secured to the forward end of said second handle in alignment with said die wheel,
   e) said crimping surface and said die wheel defining an aperture therebetween adapted to receive a connector therewithin,
   f) a link secured between said first and second handles so that said handles can pivot relative to one another,
   g) spring means urging said link to pivot relative to said first handle and thereby bias said handles away from each other,
   h) said spring means being flexed during each cycle of operation of the crimping tool as the handles are pivoted toward each other,
   i) the improvement comprising said spring means being formed with a fracture zone located at a predetermined area on said spring means, said fracture zone being designed to fracture after a predetermined number of cycles of operation that is correlated with the useful life expectancy of the tool.

2. The crimping tool of claim 1 wherein said tool is designed with a useful life expectancy of several thousands of cycles of operation, and said fracture zone of said tool is designed to fail at a level thousands of cycles below the useful life expectancy.

3. The crimping tool of claim 1 wherein said spring means comprises a torsion spring with a metal body formed of at least one, centrally located, coil, a first leg extending axially outwardly from said body toward the forward end of said first handle, and a second leg extending axially outwardly from said body toward the rearward end of said first handle said predetermined fracture zone being defined in said central coil.

4. The crimping tool of claim 3 wherein said link is triangularly shaped and responds to the movement of said second handle, and said second leg of said spring means contacts one side of said link and is flexed by the movement of said link.

5. The crimping tool of claim 3 wherein an arc of 140°, with a tolerance of ±5°, is defined between said first and said second projecting legs of said spring means.

6. The crimping tool of claim 3 wherein an arc of 180° is defined between said first and second projecting legs of said spring means.

7. A crimping tool as defined in claim 1 wherein the failure in said predetermined fracture zone disables said spring means and causes an increase in the manual force needed to operate the tool, thereby providing a tactile indication that inspection of the tool is dictated.

* * * * *